United States Patent
Wang (12) United States Patent (10) Patent No.: US 11,570,544 B1
(45) Date of Patent: Jan. 31, 2023

(54) SOUND-ABSORBING MATERIAL, PREPARATION METHOD THEREOF AND SPEAKER USING SAME

(71) Applicant: AAC Microtech (Changzhou) Co., Ltd., Changzhou (CN)

(72) Inventor: Hezhi Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/549,887

(22) Filed: Dec. 14, 2021

(30) Foreign Application Priority Data

Sep. 29, 2021 (CN) .......................... 202111153547.1

(51) Int. Cl.
| | | |
|---|---|---|
| *H04R 1/28* | (2006.01) |
| *G10K 11/162* | (2006.01) |
| *H04R 1/02* | (2006.01) |
| *C09K 5/14* | (2006.01) |

(52) U.S. Cl.
CPC .............. *H04R 1/288* (2013.01); *C09K 5/14* (2013.01); *G10K 11/162* (2013.01); *H04R 1/025* (2013.01)

(58) Field of Classification Search
CPC .......... H04R 1/288; H04R 1/025; C09K 5/14; G10K 11/162

USPC .......................................................... 381/353
See application file for complete search history.

(56) References Cited

U.S. PATENT DOCUMENTS

| | | | | |
|---|---|---|---|---|
| 8,083,024 B1 * | 12/2011 | Ritto | ..................... | B29C 70/088 |
| | | | | 381/345 |
| 2001/0050196 A1 * | 12/2001 | Okada | .................. | G10K 11/162 |
| | | | | 181/175 |
| 2018/0137850 A1 * | 5/2018 | Harrison | .............. | G10K 11/168 |

* cited by examiner

*Primary Examiner* — Sean H Nguyen
(74) *Attorney, Agent, or Firm* — W&G Law Group (57) ABSTRACT

Provided is a sound-absorbing material, including an adsorbent material and a thermal conductive material. The thermal conductive material is uniformly dispersed in the sound-absorbing material. The thermal conductive material includes a carbon fiber material, and a weight ratio of the carbon fiber material in the sound-absorbing material is within a range of 0.05% to 10%. Further provided are a preparation method of the sound-absorbing material and a speaker using the sound-absorbing material. The sound-absorbing material has higher thermal conductivity and can be added to a rear cavity of the speaker to effectively conduct heat generated when the speaker is working, thereby improving the heat dissipation performance of the speaker.

14 Claims, 4 Drawing Sheets

SOUND-ABSORBING MATERIAL, PREPARATION METHOD THEREOF AND SPEAKER USING SAME

TECHNICAL FIELD

The present disclosure relates to the technical field of heat dissipation for speakers, and in particular to a sound-absorbing material, preparation method thereof and a speaker using the sound-absorbing material.

BACKGROUND

Electro-acoustic transducers are commonly used in mobile phones, computers, televisions, automobiles and other products. As an electro-acoustic transducer, a speaker can convert electrical energy into mechanical energy of the vibration of a diaphragm when being energized, so as to radiate and sound. In addition, the voice coil of the speaker has a certain resistance value. The voice coil will heat up when the power is on, and the greater resistance or the long-term operation will cause the voice coil to produce a higher temperature rise. The high temperature will adversely affect an adhesive used for bonding the voice coil and the diaphragm, thereby reducing the service life of the speaker. In addition, with the development of speakers in a trend of miniaturization, the product structure becomes more and more compact, and the heat dissipation problem of the voice coil will become more prominent. At present, there are some methods in the industry to improve the heat dissipation efficiency of speakers, such as using materials with better thermal conductivity for shells and diaphragms of speakers, or adding thermal conductive materials to absorbent materials to form sound-absorbing materials with thermal conductivity.

Figure 1:
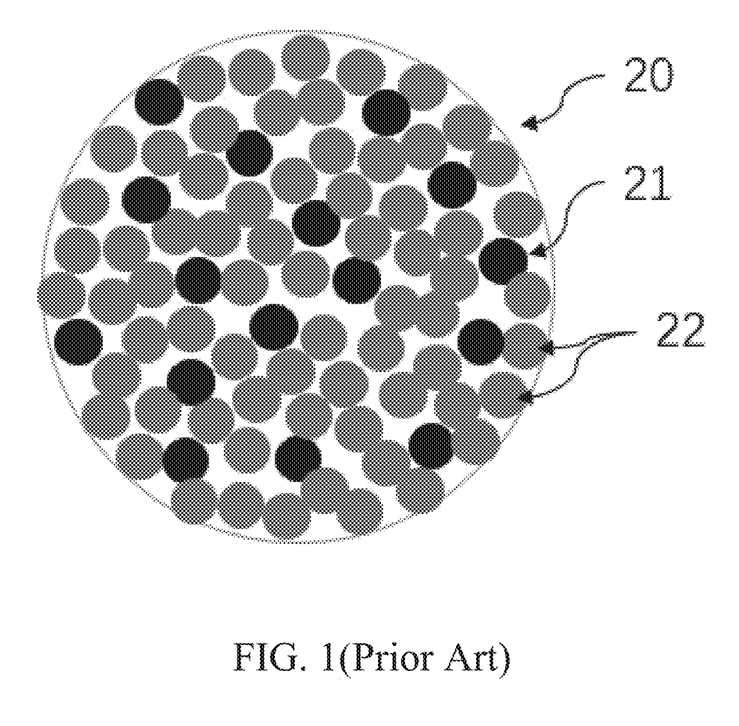
FIG. 1 is a schematic structural diagram of a sound-absorbing material in the related art.

As shown in FIG. 1, the sound-absorbing material in the related art includes a thermal conductive material 21 and an adsorbent material 22. The thermal conductive material 21 is in the form of particles or flakes and includes one or more of graphene, aluminum oxide, magnesium oxide, zinc oxide, silicon carbide, and the like. However, since the thermal conductive material 21 is in the form of particles or flakes, after being filled into the sound-absorbing material, the particles or flakes of the thermal conductive material are in a discrete state and separated from each other, which is not conducive to improving the overall thermal conductivity of the sound-absorbing material. If the thermal conductivity of the sound-absorbing material is improved by increasing the content of the thermal conductive material, the thermal conductive material will take up too much volume and the content of the adsorbent material in the sound-absorbing material will decrease, resulting in the loss of the acoustic performance of the sound-absorbing material.

Therefore, a better solution is needed to solve the heat dissipation problem of the speaker.

SUMMARY

An objective of the present disclosure is to provide a sound-absorbing material, preparation method thereof, and a speaker using the same to overcome the above technical problems. With higher thermal conductivity, the sound-absorbing material can be added to a rear cavity of a speaker to effectively conduct heat generated when the speaker is working, thereby improving the heat dissipation performance of the speaker.

In order to achieve the above objective, the present disclosure provides a sound-absorbing material, including an adsorbent material and a thermal conductive material. The thermal conductive material is uniformly dispersed in the sound-absorbing material. The thermal conductive material includes a carbon fiber material. A weight ratio of the carbon fiber material in the sound-absorbing material is within a range of 0.05% to 10%.

As an improvement, the weight ratio of the carbon fiber material in the sound-absorbing material is within a range of 0.1% to 5.0%.

As an improvement, an average diameter of the carbon fiber material is within a range of 1 nm to 50 um.

As an improvement, the average diameter of the carbon fiber material is within a range of 10 nm to 20 um.

As an improvement, the carbon fiber material includes at least one of a nano carbon fiber material or an activated carbon fiber material.

As an improvement, a length-diameter ratio of the carbon fiber material is not less than 5.

As an improvement, the adsorbent material includes at least one of a molecular sieve, activated carbon, a metal-organic framework material or a polymer framework material.

As an improvement, the adsorbent material and the thermal conductive material are bonded to form into sound-absorbing particles by an adhesive.

As an improvement, the adhesive includes at least one of a polyacrylic adhesive, a polyurethane adhesive, an epoxy resin adhesive, or a cellulose adhesive.

As an improvement, the thermal conductive material further includes a non-carbon fiber material having a weight ratio of 0% to 1% in the sound-absorbing material, and the non-carbon fiber material includes at least one of boron nitride, boron carbide, aluminum oxide, magnesium oxide, zinc oxide, or graphene.

As an improvement, the sound-absorbing material is in the form of particles with a particle size of 0.1 mm to 1 mm.

The present disclosure further provides a preparation method of any of the sound-absorbing materials as described above, including the following steps: dispersing an adsorbent material and a thermal conductive material in a solvent and mixing thoroughly to obtain a mixed solution including the adsorbent material and the thermal conductive material; adding an adhesive to the mixed solution including the adsorbent material and the thermal conductive material and mixing thoroughly to obtain a slurry including the adsorbent material and the thermal conductive material; granulating the slurry including the adsorbent material and the thermal conductive material to obtain product particles; and heat-treating the product particles to obtain the sound-absorbing material.

The present disclosure further provides a preparation method of any of the sound-absorbing materials as described above, including the following steps: dispersing an adsorbent material in a solvent and mixing thoroughly to obtain a mixed solution including the adsorbent material; adding an adhesive to the mixed solution including the adsorbent material and mixing thoroughly to obtain a slurry including the adsorbent material; granulating the slurry including the adsorbent material to obtain pre-product particles; heat-treating the pre-product particles; dispersing a thermal conductive material in a solvent and mixing thoroughly to obtain a mixed solution including the thermal conductive material; adding an adhesive to the mixed solution including the thermal conductive material and mixing thoroughly to obtain a slurry including the thermal conductive material;

dispersing the slurry including the thermal conductive material on surfaces of the heat-treated pre-product particles by way of coating to obtain product particles; and heat-treating the product particles to obtain the sound-absorbing material.

The present disclosure further provides a speaker, including a housing having an accommodating space, a sounding unit placed in the housing, and a rear cavity defined by the sounding unit and the housing, the rear cavity being filled with the sound-absorbing material as described above.

Compared with the related art, the sound-absorbing material, preparation method thereof, and the speaker using the same, as disclosed herein, have the following beneficial effects.

1. The thermal conductive carbon fiber material used has excellent thermal conductivity. Since the thermal conductive carbon fiber material has a filamentous fiber shape, after being filled into the sound-absorbing material, the fibers are likely to overlap each other to form a thermal conductive network structure, so that the sound-absorbing material has good thermal conductivity. After the sound-absorbing material is filled into a rear cavity of a speaker, a speaker with better heat dissipation performance can be obtained.

2. After being filled into the sound-absorbing material, the filamentous thermal conductive carbon fiber material occupies a small volume and is unlikely to block micropores in the surface of the absorbent material in the sound-absorbing material, which causes little adverse effect on the acoustic performance of the sound-absorbing material.

BRIEF DESCRIPTION OF DRAWINGS

In order to make the technical solutions of embodiments of the present disclosure more clear, drawings to be used for description of embodiments will be explained briefly as follows. It is appreciated that, drawings used in the following description are merely some embodiments of the present disclosure. Those skilled in the art also may obtain other drawings based on these drawings without paying creative labor.

DESCRIPTION OF EMBODIMENTS

The technical solutions in embodiments of the present disclosure will be described clearly and completely below in connection with the drawings in the embodiments of the present disclosure, and it will be apparent that the embodiments described here are merely a part, not all of the embodiments of the present disclosure. All other embodiments obtained by a person of ordinary skill in the art based on the embodiments of the present disclosure without creative efforts shall fall within the protection scope of the present disclosure.

Figure 2:
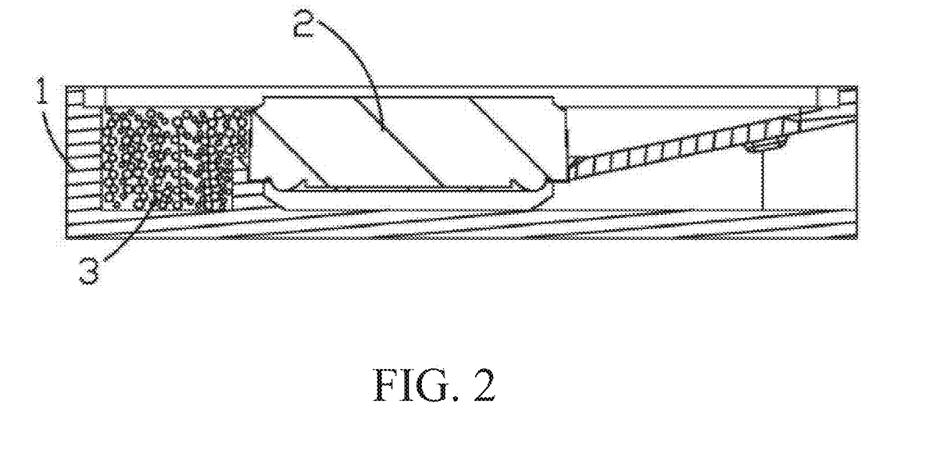
FIG. 2 is a schematic structural diagram of a speaker of the present disclosure.

Referring to FIG. 2, a speaker of the present disclosure includes a housing 1 with an accommodating space, a sounding unit 2 placed in the housing 1, and a rear cavity 3 defined by the sounding unit 2 and the housing 1, and the rear cavity 3 is filled with a sound-absorbing material.

The sound-absorbing material includes an adsorbent material and a thermal conductive material and the thermal conductive material is uniformly dispersed in the sound-absorbing material.

The adsorbent material includes at least one of a molecular sieve, activated carbon, a metal-organic framework material and a polymer framework material. The molecular sieve has a pore size generally between 0.4 nm and 1.0 nm and a specific surface area between 300 $m^2/g$ and 1000 $m^2/g$. The molecular sieve includes at least one of a FER-structure molecular sieve, an MFI-structure molecular sieve, a BEA-structure molecular sieve, or a MEL-structure molecular sieve.

The thermal conductive material includes a carbon fiber material and the carbon fiber material has excellent thermal conductivity. Moreover, the thermal conductive carbon fiber material has a filamentary fiber shape. After being filled into the sound-absorbing material, the carbon fibers are likely to overlap each other to form a thermal conductive network structure, so that the sound-absorbing material has good thermal conductivity. After the sound-absorbing material is filled into a rear cavity 3 of a speaker, a speaker with better heat dissipation performance can be obtained. Moreover, after being filled into the sound-absorbing material, the filamentary carbon fiber material occupies a small volume and is unlikely to block micropores in the surface of the absorbent material in the sound-absorbing material, which causes little effect on the acoustic performance of the sound-absorbing material.

It should be noted that the weight ratio of the carbon fiber material in the sound-absorbing material needs to be maintained in a range of 0.05% to 10%. If the content of the carbon fiber material is excessively low, it is not conducive to improving the thermal conductivity of the sound-absorbing material. An excessive air content will cause reduction of the acoustic performance of the sound-absorbing material. In an embodiment, the weight ratio of the carbon fiber material in the sound-absorbing material needs to be maintained within a range of 0.1% to 5.0%.

Further, an average diameter of the carbon fiber material is within a range of 1 nm to 50 um. Optionally, the average diameter of the carbon fiber material is within a range of 10 nm to 20 um.

Further, a length-diameter ratio of the carbon fiber material is not less than 5. When the length-diameter ratio of the carbon fiber material is greater than 5, the carbon fibers are more likely to overlap each other to form a thermal conductive network structure, so that the sound-absorbing material has better thermal conductivity. On the contrary, the fiber morphology of the carbon fiber material is closer to particles, which is not conducive to the overlapping of the carbon fibers to form a thermal conductive network structure.

Further, the thermal conductive material further includes a non-carbon fiber material having a weight ratio of 0 to 1% in the sound-absorbing material. The non-carbon fiber material includes at least one of boron nitride, boron carbide, aluminum oxide, magnesium oxide, zinc oxide, and graphene. Based on experiments, it is found that adding the non-carbon fiber material in the above ratio to the sound-absorbing material can work together with the carbon fiber material to improve thermal conductivity. When the addition of the non-carbon fiber material is higher than the above ratio, since the content of the non-carbon fiber material is so high that the non-carbon fiber material occupies more volume, resulting in the loss of the acoustic performance of the sound-absorbing material.

Further, the adsorbent material and the thermal conductive material may also be bonded and formed into sound-absorbing particles by an adhesive (i.e., the sound-absorbing material exists in the form of sound-absorbing particles). The adhesive includes at least one of a polyacrylic adhesive, a polyurethane adhesive, an epoxy resin adhesive, and a cellulose adhesive.

Figure 3:
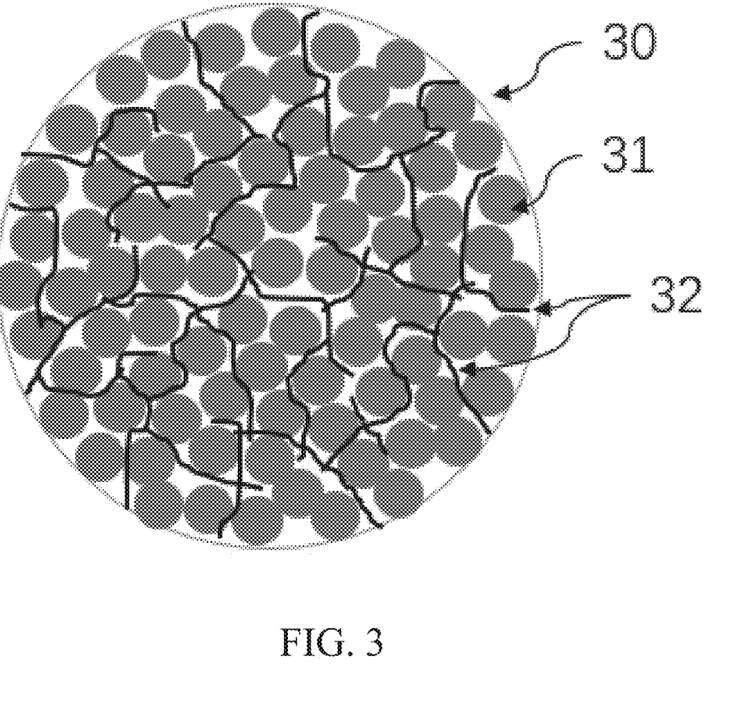
FIG. 3 is a schematic structural diagram of a sound-absorbing material of the present disclosure.

As shown in FIG. 3, the sound-absorbing particles are granular. However, it should be noted that, in addition to granular, the sound-absorbing particles may also be in the form of blocks or flakes.

Based on experiments, it is found that if the particle size of the sound-absorbing material is less than 0.1 mm, gaps between the particles will be small, resulting in a large air flow resistance of the sound-absorbing material; if the particles are greater than 1 mm, an air diffusion path in the particles will be too large, which is not conducive to exerting the sound-absorbing performance of the sound-absorbing material. Therefore, the particle size of the sound-absorbing material is optionally within a range of 0.1 mm to 1 mm.

Further, the carbon fiber material includes at least one of a nano carbon fiber material and an activated carbon fiber material.

The thermal conductivity of the nano carbon fiber material can be greater than 1500 W/mK.

Figure 4:
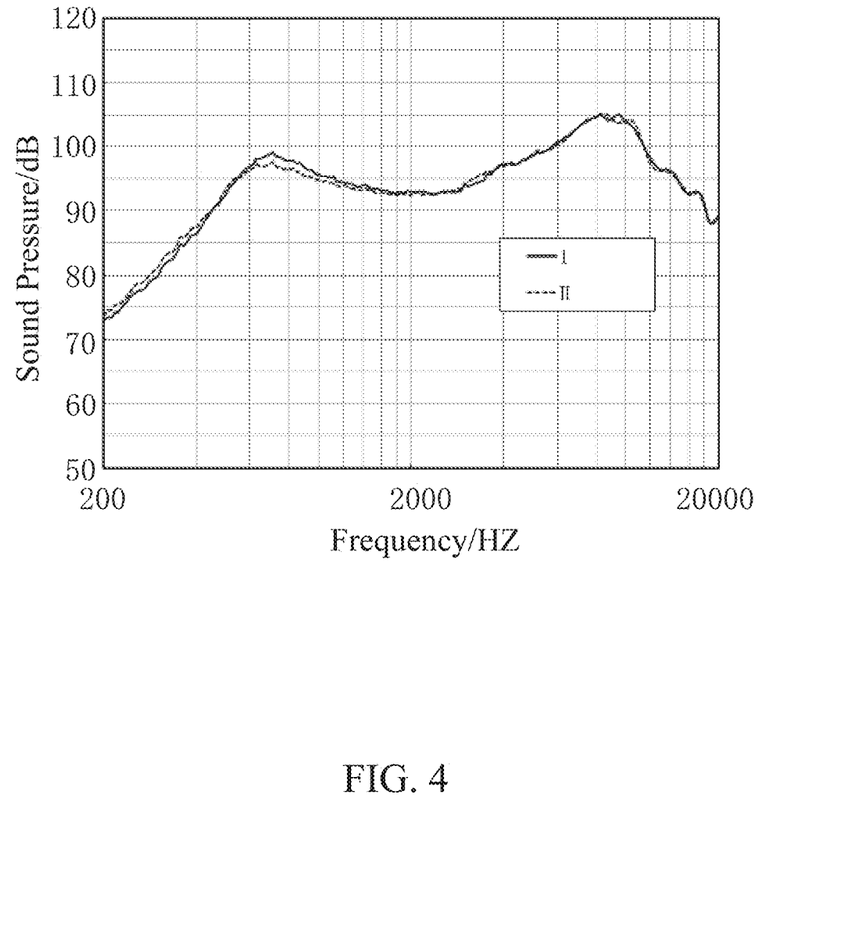
FIG. 4 shows frequency response curves of a speaker of the present disclosure having a sound-absorbing material including or not including an activated carbon fiber.

In addition to high thermal conductivity, the activated carbon fiber material also has a large number of uniform micropores in the surface. The pore size of the micropores is within a range of 1 nm to 4 nm, and the specific surface area is greater than 1000 $m^2/g$. Therefore, similar to a molecular sieve, the activated carbon fiber material also has excellent adsorption capacity. Therefore, due to use of the activated carbon fiber as a heat-conducting material, a heat dissipation capacity can be provided, and its micropores and huge specific surface area can simultaneously provide a certain adsorption capacity. FIG. 4 shows frequency response curves of a speaker of the present disclosure having a sound-absorbing material including or not including an activated carbon fiber. The volume of the rear cavity 3 of a speaker model is 1 cc, curve I indicates a frequency response curve of the speaker without the sound-absorbing material including the activated carbon fiber, and curve II is a frequency response curve of the speaker with the sound-absorbing material including the activated carbon fiber. It can be seen from FIG. 4 that after the addition of the activated carbon fiber material, the speaker shows a higher sound pressure level in a low frequency range, indicating that the activated carbon fiber material has an acoustic effect similar to that of a molecular sieve, activated carbon or other materials.

The above-mentioned sound-absorbing material can be prepared by the following two preparation methods.

A first preparation method specifically includes the following steps:

S1-1: dispersing an adsorbent material and a thermal conductive material in a solvent and mixing thoroughly to obtain a mixed solution including the adsorbent material and the thermal conductive material, the solvent can be at least one of water, ethanol, or acetone.

S1-2: adding an adhesive to the mixed solution including the adsorbent material and the thermal conductive material and mixing thoroughly to obtain a slurry including the adsorbent material and the thermal conductive material.

S1-3: granulating the slurry including the adsorbent material and the thermal conductive material to obtain product particles.

S1-4: heat-treating the product particles to obtain the sound-absorbing material.

A second preparation method specifically includes the following steps:

S2-1: dispersing an adsorbent material in a solvent and mixing thoroughly to obtain a mixed solution including the adsorbent material.

S2-2: adding an adhesive to the mixed solution including the adsorbent material and mixing thoroughly to obtain a slurry including the adsorbent material.

S2-3: granulating the slurry including the adsorbent material to obtain pre-product particles.

S2-4: heat-treating the pre-product particles.

S2-5: dispersing a thermal conductive material in a solvent and mixing thoroughly to obtain a mixed solution including the thermal conductive material.

S2-6: adding an adhesive to the mixed solution including the thermal conductive material and mixing thoroughly to obtain a slurry including the thermal conductive material.

S2-7: dispersing the slurry including the thermal conductive material on surfaces of the heat-treated pre-product particles by way of coating to obtain product particles.

S2-8: heat-treating the product particles to obtain the sound-absorbing material.

In the above preparation methods, after heat treatment, the product particles can be sieved to obtain a sound-absorbing material with a particle size of 0.1 mm to 1 mm.

It should be noted that the granulation process in the above preparation methods may be any of spray granulation, rolling ball granulation, coating, spraying, and mold casting.

The implementation of the present disclosure will be explained below in conjunction with specific examples.

Example 1

A sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was a MEL molecular sieve, the thermal conductive material used was a nano carbon fiber material, the diameter of the nano carbon fiber material was within a range of 150 nm to 200 nm, the length-diameter ratio of the nano carbon fiber material was 70, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the nano carbon fiber material in the sound-absorbing material was 0.1%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 2

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was a MEL molecular sieve, the thermal conductive material used was a nano carbon fiber material, the diameter of the nano carbon fiber material was within a range of 150 nm to 200 nm, the length-diameter ratio of the nano carbon fiber material was 70, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the nano carbon fiber material in the sound-absorbing material was 1%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 3

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was a MEL molecular sieve, the thermal conductive material used was a nano carbon fiber material, the diameter of the nano carbon fiber material was within a range of 150 nm to 200 nm, the length-diameter ratio of the nano carbon fiber material was 70, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the nano carbon fiber material in the sound-absorbing material was 5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 4

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was a MEL molecular sieve, the thermal conductive material used includes a nano carbon fiber material carbon and boron nitride, the diameter of the nano carbon fiber material was within a range of 150 nm to 200 nm, the length-diameter ratio of the nano carbon fiber material was 70, the particle size of boron nitride was 400 nm, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, the weight ratio of the nano carbon fiber material in the sound-absorbing material was 1%, and the weight ratio of boron nitride in the sound-absorbing material was 1%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 5

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was a MEL molecular sieve, the thermal conductive material used was an activated carbon fiber material, the diameter of the activated carbon fiber material was 1 μm, the length-diameter ratio of the activated carbon fiber material was 10, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the activated carbon fiber material in the sound-absorbing material was 0.2%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 6

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was an MFI molecular sieve, the thermal conductive material used was an activated carbon fiber material, the diameter of the activated carbon fiber material was 1 μm, the length-diameter ratio of the activated carbon fiber material was 10, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the activated carbon fiber material in the sound-absorbing material was 0.5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 7

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was an MFI molecular sieve, the thermal conductive material used was an activated carbon fiber material, the diameter of the activated carbon fiber material was 1 μm, the length-diameter ratio of the activated carbon fiber material was 10, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the activated carbon fiber material in the sound-absorbing material was 1%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 8

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was an MFI molecular sieve, the thermal conductive material used was an activated carbon fiber material, the diameter of the activated carbon fiber material was 1 μm, the length-diameter ratio of the activated carbon fiber material was 10, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the activated carbon fiber material in the sound-absorbing material was 5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 9

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was an MFI molecular sieve, the thermal conductive material used includes an activated carbon fiber material and aluminium oxide, the diameter of the activated carbon fiber material was 1 μm, the length-diameter ratio of the activated carbon fiber material was 10, the particle size of aluminium oxide was 500 nm, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, the weight ratio of the activated carbon fiber material in the sound-absorbing material was 0.5%, and the weight ratio of aluminium oxide in the sound-absorbing material was 5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 10

The sound-absorbing material was prepared by the first preparation method as follows:

An adsorbent material and a thermal conductive material were dispersed in a solvent and the resulting solution was stirred and mixed thoroughly to obtain a mixed solution including the adsorbent material and the thermal conductive material. The adsorbent material used was an MFI molecular sieve, the thermal conductive material used was an activated carbon fiber material, the diameter of the activated carbon fiber material was 200 nm, the length-diameter ratio of the activated carbon fiber material was 50, and the solvent was water.

An adhesive was added to the mixed solution including the adsorbent material and the thermal conductive material and the resulting solution was stirred and mixed thoroughly to obtain a slurry including the adsorbent material and the thermal conductive material. The adhesive used was a polyacrylic adhesive.

The slurry including the adsorbent material and the thermal conductive material was granulated to obtain product particles. The granulation process adopted was spray granulation.

The product particles were heat-treated to obtain the sound-absorbing material. The product particles were heat-treated in an oven, and the weight ratio of the activated carbon fiber material in the sound-absorbing material was 0.5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Example 11

Specifically, a sound-absorbing material was prepared by the second preparation method as follows:

An adsorbent material was dispersed in a solvent and the resulting solution was stirred and mixed thoroughly to obtain a mixed solution including the adsorbent material. The adsorbent material used was an MFI molecular sieve and the solvent used was water.

An adhesive was added to the mixed solution including the adsorbent material and the resulting solution was stirred and mixed thoroughly to obtain a slurry including the adsorbent material. The adhesive used was a polyacrylic adhesive.

The slurry including the adsorbent material was granulated to obtain pre-product particles. The granulation process adopted was spray granulation.

The pre-product particles were heat-treated. The pre-product particles were heat-treated in an oven.

A thermal conductive material was dispersed in a solvent and the resulting solution was stirred and mixed thoroughly to obtain a mixed solution including the thermal conductive material. The thermal conductive material used was an activated carbon fiber material, the diameter of the activated carbon fiber material was 1 μm, and the length-diameter ratio of the activated carbon fiber material was 10.

An adhesive was added to the mixed solution including the thermal conductive material and the resulting solution was stirred and mixed thoroughly to obtain a slurry including the thermal conductive material.

The slurry including the thermal conductive material was dispersed on surfaces of the heat-treated pre-product particles by way of coating to obtain product particles.

The product particles were heat-treated to obtain the sound-absorbing material. The weight ratio of the activated carbon fiber material in the sound-absorbing material was 0.5%.

After heat treatment, the product particles were sieved through a sieve to obtain a sound-absorbing material with a particle size of 0.1 mm to 1 mm. The sound-absorbing material was filled into a rear cavity 3 of a speaker to obtain a speaker with thermal conductivity.

Compared with the related art, the sound-absorbing material, preparation method thereof, and the speaker using the sound-absorbing material, as disclosed herein, have the following beneficial effects.

1. The thermal conductive carbon fiber material used has excellent thermal conductivity. Since the thermal conductive carbon fiber material has a filamentous fiber shape, after being filled into the sound-absorbing material, the fibers are likely to overlap each other to form a thermal conductive network structure, so that the sound-absorbing material has good thermal conductivity. After the sound-absorbing material is filled into a rear cavity of a speaker, a speaker with better heat dissipation performance can be obtained.

2. After being filled into the sound-absorbing material, the filamentous fiber material occupies a small volume and is unlikely to block micropores in the surface of the absorbent material in the sound-absorbing material, which causes little adverse effect on the acoustic performance of the sound-absorbing material.

The above are only the embodiments of the present disclosure. It should be noted here that for those of ordinary skill in the art, improvements can be made without departing from the inventive concept of the present disclosure and these improvements all belong to the scope of the present disclosure.

What is claimed is:

1. A sound-absorbing material, comprising an adsorbent material and a thermal conductive material, wherein the thermal conductive material is uniformly dispersed in the sound-absorbing material, the thermal conductive material comprises a carbon fiber material, and a weight ratio of the carbon fiber material in the sound-absorbing material is within a range of 0.05% to 10%.

2. The sound-absorbing material as described in claim 1, wherein the weight ratio of the carbon fiber material in the sound-absorbing material is within a range of 0.1% to 5.0%.

3. The sound-absorbing material as described in claim 1, wherein an average diameter of the carbon fiber material is within a range of 1 nm to 50 um.

4. The sound-absorbing material as described in claim 3, wherein the average diameter of the carbon fiber material is within a range of 10 nm to 20 um.

5. The sound-absorbing material as described in claim 1, wherein the carbon fiber material comprises at least one of a nano carbon fiber material or an activated carbon fiber material.

6. The sound-absorbing material as described in claim 1, wherein a length-diameter ratio of the carbon fiber material is not less than 5.

7. The sound-absorbing material as described in claim 1, wherein the adsorbent material comprises at least one of a molecular sieve, activated carbon, a metal-organic framework material or a polymer framework material.

8. The sound-absorbing material as described in claim 1, wherein the adsorbent material and the thermal conductive material are bonded to form into sound-absorbing particles by an adhesive.

9. The sound-absorbing material as described in claim 8, wherein the adhesive comprises at least one of a polyacrylic adhesive, a polyurethane adhesive, an epoxy resin adhesive, or a cellulose adhesive.

10. The sound-absorbing material as described in claim 1, wherein the thermal conductive material further comprises a non-carbon fiber material having a weight ratio of 0% to 1% in the sound-absorbing material, and the non-carbon fiber material comprises at least one of boron nitride, boron carbide, aluminum oxide, magnesium oxide, zinc oxide, or graphene.

11. The sound-absorbing material as described in claim 1, wherein the sound-absorbing material is in form of particles with a particle size of 0.1 mm to 1 mm.

12. A preparation method of the sound-absorbing material as described in claim 1, comprising following steps:
dispersing an adsorbent material and a thermal conductive material in a solvent and mixing thoroughly to obtain a mixed solution comprising the adsorbent material and the thermal conductive material;
adding an adhesive to the mixed solution comprising the adsorbent material and the thermal conductive material and mixing thoroughly to obtain a slurry comprising the adsorbent material and the thermal conductive material;
granulating the slurry comprising the adsorbent material and the thermal conductive material to obtain product particles; and
heat-treating the product particles to obtain the sound-absorbing material.

13. A preparation method of the sound-absorbing material as described in claim 1, comprising following steps:
dispersing an adsorbent material in a solvent and mixing thoroughly to obtain a mixed solution comprising the adsorbent material;
adding an adhesive to the mixed solution comprising the adsorbent material and mixing thoroughly to obtain a slurry comprising the adsorbent material;
granulating the slurry comprising the adsorbent material to obtain pre-product particles;
heat-treating the pre-product particles;
dispersing a thermal conductive material in a solvent and mixing thoroughly to obtain a mixed solution comprising the thermal conductive material;
adding an adhesive to the mixed solution comprising the thermal conductive material and mixing thoroughly to obtain a slurry comprising the thermal conductive material;
dispersing the slurry comprising the thermal conductive material on surfaces of the heat-treated pre-product particles by way of coating to obtain product particles; and
heat-treating the product particles to obtain the sound-absorbing material.

14. A speaker, comprising a housing having an accommodating space, a sounding unit placed in the housing, and a rear cavity defined by the sounding unit and the housing, the rear cavity being filled with the sound-absorbing material as described in claim 1.

* * * * *